(12) United States Patent
Imanishi et al.

(10) Patent No.: US 9,006,381 B2
(45) Date of Patent: Apr. 14, 2015

(54) IMPACT-RESISTANT POLYAMIDE COMPOSITION AND PROCESS FOR PRODUCTION OF SAME

(75) Inventors: Tokizane Imanishi, Hyogo (JP); Hirofumi Nishida, Hyogo (JP)

(73) Assignee: Nagase Chemtex Corporation, Osaka (JP)

( * ) Notice: Subject to any disclaimer, the term of this patent is extended or adjusted under 35 U.S.C. 154(b) by 297 days.

(21) Appl. No.: 13/806,055

(22) PCT Filed: Jun. 23, 2011

(86) PCT No.: PCT/JP2011/064403
§ 371 (c)(1),
(2), (4) Date: Apr. 8, 2013

(87) PCT Pub. No.: WO2011/162333
PCT Pub. Date: Dec. 29, 2011

(65) Prior Publication Data
US 2013/0190471 A1    Jul. 25, 2013

(30) Foreign Application Priority Data

Jun. 23, 2010   (JP) ................................ 2010-142613

(51) Int. Cl.
| | | |
|---|---|---|
| C08G 69/08 | (2006.01) | |
| C08G 69/14 | (2006.01) | |
| C08G 69/20 | (2006.01) | |
| C08L 77/02 | (2006.01) | |
| C08G 69/18 | (2006.01) | |

(52) U.S. Cl.
CPC ................ *C08G 69/14* (2013.01); *C08G 69/20* (2013.01); *C08L 77/02* (2013.01); *C08G 69/18* (2013.01)

(58) Field of Classification Search
CPC ........ C08F 8/00; C07C 237/04; C07C 309/14
USPC ............... 252/183.11, 183; 528/310; 564/123
See application file for complete search history.

(56) References Cited

U.S. PATENT DOCUMENTS

| | | | |
|---|---|---|---|
| 3,542,720 A | | 11/1970 | Kolyer et al. |
| 5,650,633 A | * | 7/1997 | Ahmed et al. ............ 252/183.11 |
| 2006/0173156 A1 | * | 8/2006 | Van Geenen et al. ......... 528/310 |
| 2007/0203282 A1 | | 8/2007 | Bradley et al. |

FOREIGN PATENT DOCUMENTS

| | | |
|---|---|---|
| EP | 0158394 A1 | 10/1985 |
| EP | 2022809 A1 | 2/2009 |
| JP | 51-68697 | 6/1976 |
| JP | 2001-122934 | 5/2001 |
| JP | 2010-106246 | 5/2010 |

OTHER PUBLICATIONS

International Search Report dated Sep. 20, 2011, in corresponding PCT International Application No. PCT/JP2011/064403 (with English translation).
Supplementary European Search Report dated Aug. 11, 2014, issued for the corresponding European Patent Application No. 11798214.0.

\* cited by examiner

*Primary Examiner* — Gregory Listvoyb
(74) *Attorney, Agent, or Firm* — Locke Lord LLP

(57) ABSTRACT

Provided are: an impact-resistant polyamide composition which exhibits improved toughness and improved impact strength and which can be easily polymerized in-situ in a molding stage; and a novel process for the production of the same. The novel process comprises initiating the anionic polymerization of ε-caprolactam in the presence of (A) an anionic polymerization catalyst, (B) an anionic polymerization activator, (C) 2.0 to 30% by weight (relative to the ε-caprolactam) of an N,N-disubstituted vinylbenzylamine, and (D) a radical polymerization initiator, and subjecting the resulting system to reaction under conditions comprising a reaction temperature of the reaction system of 120 to 180° C. and a reaction time of 10 seconds to 120 minutes. Since radical polymerization in the process is conducted without hindering the anionic polymerization, an alloyed polyamide composed of both polycaprolactam and poly (N,N-disubstituted vinylbenzylamine) can be obtained.

15 Claims, 2 Drawing Sheets

COMPARATIVE EXAMPLE 1

EXAMPLE 1

IMPACT-RESISTANT POLYAMIDE COMPOSITION AND PROCESS FOR PRODUCTION OF SAME

CROSS-REFERENCE TO RELATED APPLICATIONS

This application is the U.S. national phase application pursuant to 35 U.S.C. §371 of PCT International Patent Application No. PCT/JP2011/064403, filed Jun. 23, 2011, which claims priority to Japanese Patent Application No. 2010-142613, filed Jun. 23, 2010. The entire contents of the aforementioned patent applications are incorporated herein by this reference.

TECHNICAL FIELD

The present invention relates to a polyamide composition having resistance to impact with improved toughness and impact strength, and a process for production thereof.

BACKGROUND ART

Anionic polymerization of a lactam such as a caprolactam in the presence of an anionic polymerization catalyst and a polymerization activator is a well known technique, and the method is known in which by using this process, polymerization is conducted in-situ in molding to produce various kinds of molded articles including large molding products.

Polyamides, such as a polycaprolactam, obtained by anionic polymerization have the advantage that they have a high crystallinity and are excellent in properties such as mechanical strength, wear resistance, creep resistance and chemical resistance. On the other hand, however, those polyamides are known to have the disadvantage that they are low in resistance to impact, poor in breaking elongation and lack in toughness. As technical means to overcome the disadvantage, the use of a substituted amide monomer, such as N,N-dimethylbenzamide, N,N-dimethylacetamide and N-methylpyrrolidone, as a plasticizer has been proposed. For example, Patent Document 1 discloses the use of an N-alkyl pyrrolidone having a lower alkyl substituent, and describes that the alkyl group has 1 to 4 carbon atoms, and is most preferably methyl or ethyl. However, since the monomeric plasticizer tends to bleed out, its effect is lost over time. Therefore, the use of a polymeric plasticizer has been proposed. For example, Patent Document 2 discloses anionic polymerization conducted in the presence of nylon 11. In Patent Document 3, a highly branched aromatic compound-based polymer is used, and the polymer is bound to a polyamide.

Also, a method of modifying a polyamide by forming the polyamide into a block copolymer has been contemplated. For example, Patent Document 4 and documents cited therein, Patent Document 5 and Patent Document 6 disclose modifying a polyamide by forming the polyamide into a block copolymer, and Patent Document 7 discloses a modification method of conducting polymerization in the presence of a prepolymer of carbamoyl lactam and polyol.

However, the conventional production processes are unfavorable to polymerization in-situ in a molding stage because there is the disadvantage that the polymerization time is increased due to addition of other polymers to a polymerization system, and also the viscosity of a raw material is caused to rise, and additional steps are required in production of a polyamide. Further, the disadvantage can be pointed out that impact strength is not necessarily sufficiently improved.

PRIOR ART DOCUMENTS

Patent Documents

Patent Document 1: JP-B-47-22338
Patent Document 2: JP-B-48-10954
Patent Document 3: WO 00/22046
Patent Document 4: JP-B-49-41354
Patent Document 5: JP-B-54-40119
Patent Document 6: JP-B-54-40120
Patent Document 7: JP-B-59-96132

SUMMARY OF THE INVENTION

Problems to be Solved by the Invention

It is an object of the present invention to provide an impact-resistant polyamide composition having resistance to impact with improved toughness and impact strength and being able to be easily polymerized in-situ in a molding stage while a polymerization raw material maintains a viscosity that allows easy handling, and a novel process for production thereof.

Means to Solve the Problems

That is, the present invention is a polymerizable composition, comprising (A) an anionic polymerization catalyst, (B) an anionic polymerization activator, (C) 2.0 to 30% by weight, based on the weight of ε-caprolactam, of an N,N-disubstituted vinylbenzylamine represented by general formula (I), (D) a radical polymerization initiator and (E) ε-caprolactam (hereinafter, referred to simply as ε-caprolactam without symbol (E) in the specification).

Also, the present invention is a process for producing a polyamide composition, comprising initiating anionic polymerization of ε-caprolactam in the presence of (A) an anionic polymerization catalyst, (B) an anionic polymerization activator, (C) 2.0 to 30% by weight, based on the weight of ε-caprolactam, of an N,N-disubstituted vinylbenzylamine represented by general formula (I) and (D) a radical polymerization initiator, and subjecting the resulting system to reaction under conditions of a reaction temperature of the reaction system of 120 to 180° C. and a reaction time of 10 seconds to 120 minutes.

Further, the present invention is a polymer composition obtained by polymerizing the above-mentioned polymerizable composition.

[Chemical Formula 1]

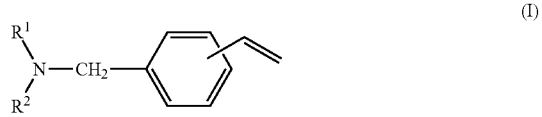
(I)

Wherein, in general formula (I), $R^1$ and $R^2$ are the same or different and each are a straight-chain or branched-chain saturated hydrocarbon group having 2 to 15 carbon atoms, wherein the saturated hydrocarbon group may have one —O— bond between two carbon atoms when the number of carbon atoms is 2, and one or two —O— bonds between two carbon atoms when the number of carbon atoms is 3 or more.

In a preferred embodiment of the present invention, the N,N-disubstituted vinylbenzylamine (C) is one in which $R^1$ and $R^2$ in general formula (I) are the same or different and each are a straight-chain or branched-chain alkyl group having 2 to 12 carbon atoms.

In another preferred embodiment of the present invention, the N,N-disubstituted vinylbenzylamine (C) is one in which $R^1$ and $R^2$ in general formula (I) are the same or different and each are a straight-chain or branched-chain saturated hydrocarbon group having 2 to 12 carbon atoms wherein the saturated hydrocarbon group has one —O— bond between two carbon atoms.

In another preferred embodiment of the present invention, the N,N-disubstituted vinylbenzylamine (C) is one in which $R^1$ and $R^2$ in general formula (I) are the same and each are a group represented by —$(CH_2)$m-O—$(CH_2)$n-$CH_3$ wherein n=0, 1, 2, 3 or 4, and m=1 or 2.

In the present invention, for the N,N-disubstituted vinylbenzylamine (C) described above, at least one selected from the group consisting of N,N-bis(ethyl)-4-vinylbenzylamine, N,N-bis(n-propyl)-4-vinylbenzylamine, N,N-bis(n-butyl)-4-vinylbenzylamine, N,N-bis(n-amyl)-4-vinylbenzylamine, N,N-bis(n-hexyl)-4-vinylbenzylamine, N,N-bis(n-octyl)-4-vinylbenzylamine, N,N-bis(n-decyl)-4-vinylbenzylamine, N,N-bis(n-dodecyl)-4-vinylbenzylamine, N,N-bis(2-methoxyethyl)-4-vinylbenzylamine, N,N-bis(2-ethoxyethyl)-4-vinylbenzylamine and N,N-di-2-ethylhexyl-4-vinylbenzylamine is preferably used.

In the present invention, the radical polymerization initiator (D) is preferably tetraphenylethanediol.

In one preferred embodiment of the present invention, the N,N-disubstituted vinylbenzylamine (C) described above is present in an amount of preferably 2.0 to 30% by weight based on the weight of ε-caprolactam and the radical polymerization initiator (D) is present in an amount of 0.01 to 20% by weight based on the weight of the N,N-disubstituted vinylbenzylamine (C).

Effects of the Invention

Owing to the constitution described above, the following effects are to be mentioned.
(1) In the present invention, bleed-out of low-molecular weight components does not occur in a polymer composition, and it can be expected from evidences of GPC and DSC that radical polymerizable components are formed into a polymer. Moreover, anionic polymerization of caprolactam is not hindered. Thus, a composition in which a radical-polymerized polymer and an anionic-polymerized polymer coexist, probably form a polymer alloy, can be obtained using a radical polymerizable monomer component and caprolactam, respectively, as raw materials. A polyamide modification process like this has not been previously known.
(2) The polyamide composition of the present invention retains a high crystallinity comparable to that of a polycaprolactam obtained by conducting anionic polymerization in the absence of a radical polymerization system of using the N,N-disubstituted vinylbenzylamine (C) described above. Therefore, advantageous properties resulting from a high crystallinity is persistently retained.
(3) The polyamide composition of the present invention has high Izod impact strength and excellent toughness, retains a high crystallinity, and is excellent in properties such as mechanical strength, wear resistance, creep resistance and chemical resistance.
(4) According to the production process of the present invention, a reduction in polymerization speed associated with the use of a polymer component does not occur, the viscosity of a polymerization raw material can be kept low, and advantageous characteristics of anionic polymerization of caprolactam are not deteriorated.

MODE FOR CARRYING OUT THE INVENTION

Figure 1:
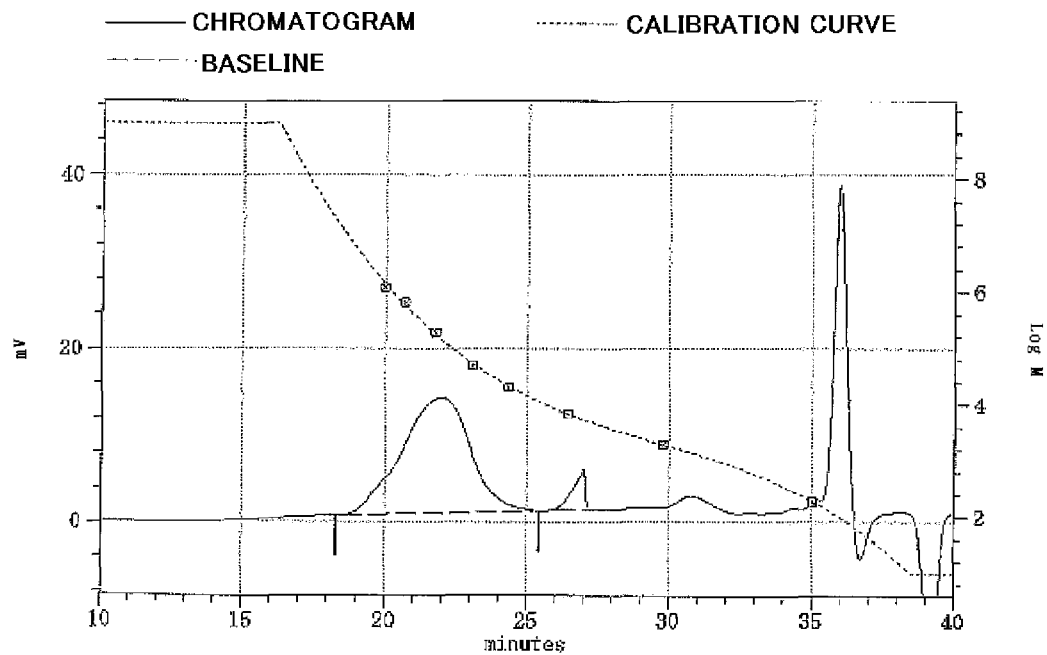
FIG. 1 is a GPC chart for a polymer composition of Example 1.

In the present invention, anionic polymerization of caprolactam can be conducted in accordance with a known process using a known starting raw material. Namely, a known process for production of a polyamide can be incorporated in which ε-caprolactam is polymerized in the presence of an anionic polymerization catalyst and an anionic polymerization activator preferably under substantially water-free conditions. ε-caprolactam is in the form of a low-viscosity liquid at a temperature equal to or higher than its melting point of 70° C., and can be formed into a thermoplastic polymer by subjecting it to anionic polymerization in the presence of a catalyst and an activator. The reaction is carried out under water-free conditions without adding water to a reaction system, but inclusion of moisture coming from water vapor in the air is not precluded, and therefore, in this sense, the reaction is carried out under substantially water-free conditions. That is, a very small amount of water, for example, 1000 ppm or less, preferably 500 ppm or less, more preferably 200 ppm or less of water may be contained.

The anionic polymerization catalyst (A) is, for example, at least one selected from the group consisting of an alkali metal, an alkali earth metal, and a hydride, an oxide, a hydroxide, a carbonate, a carboxylate, an alkylate, an alkoxide, a lactamate and a Grignard compound of the aforementioned metals. Among them, an alkali metal lactamate (for example, Na-caprolactamate or K-caprolactamate) is preferable. They may be used alone or in combination of two or more kinds.

The use amount of the anionic polymerization catalyst (A) is preferably 0.03 to 2.5% by weight based on the weight of ε-caprolactam. The amount is more preferably 0.5 to 2.0% by weight, further preferably 1.0 to 1.5% by weight.

Examples of the anionic polymerization activator (B) described above may include an isocyanate, an acyllactam, a carbamidolactam, an isocyanurate derivative, an acid halide and an urea derivative. Specific examples include known organic isocyanates such as n-butyl isocyanate, phenyl isocyanate, octyl isocyanate, 1,6-hexamethylene diisocyanate, tolylene diisocyanate and isophorone diisocyanate; N-acetyl-ε-caprolactam, 1,6-hexamethylene biscarbamidolactam, triallyl isocyanurate, terephthaloyl chloride and 1,3-diphenylurea. Among them, organic isocyanates are preferable. They may be used alone or in combination of two or more kinds.

The use amount of the anionic polymerization activator (B) described above is preferably 0.03 to 3.5% by weight based on the weight of ε-caprolactam. The amount is more preferably 0.3 to 2.5% by weight, further preferably 0.5 to 1.5% by weight.

For the N,N-disubstituted vinylbenzylamine (C) represented by general formula (I) in the present invention, $R^1$ and $R^2$ in general formula (I) may be the same substituent or different substituents. A substitution product having the same substituent can be obtained by preparing a substituted amine using one substitution compound, and a substitution product having different substituents can be obtained by preparing a substituted amine using two kinds of substitution compounds. There is no particular limitation as to whether substituents are the same or different, but generally a substitution product having the same substituent, which is easily available, can be preferably used.

$R^1$ and $R^2$ in general formula (I) each are a straight-chain or branched-chain saturated hydrocarbon group having 2 to 15 carbon atoms, wherein the saturated hydrocarbon group may have one —O— bond between two carbon atoms when the number of carbon atoms is 2, and one or two —O— bonds between two carbon atoms when the number of carbon atoms is 3 or more. Examples of the saturated hydrocarbon group having no —O— bond between two carbon atoms may include alkyl groups having 2 to 15 carbon atoms. The straight-chain or branched-chain alkyl group having 2 to 15 carbon atoms is not particularly limited, and examples thereof may include ethyl, propyl, butyl, amyl, hexyl, octyl, decyl, dodecyl and ethylhexyl. Among them, from the viewpoint of resistance to impact, ethyl, propyl, butyl, amyl, hexyl, octyl, decyl and dodecyl are preferable, and ethyl and propyl are more preferable. In a preferred embodiment, $R^1$ and $R^2$ are the same, and are the above-mentioned preferable or more preferable alkyl group.

Examples of the saturated hydrocarbon group having —O— bonds between two carbon atoms include —CH$_2$—O—CH$_3$ when the number of carbon atoms is 2, —CH$_2$—O—C$_2$H$_5$, —C$_2$H$_4$—O—CH$_3$ and —CH$_2$—O—CH$_2$—O—CH$_3$ when the number of carbon atoms is 3, and CH$_2$—O—C$_3$H$_7$, —C$_2$H$_4$—O—C$_2$H$_5$, C$_3$H$_6$—O—CH$_3$, —CH$_2$—O—CH$_2$—O—C$_2$H$_5$ and —CH$_2$—O—C$_2$H$_4$—O—CH$_3$ when the number of carbon atoms is 4, and further in accordance with this manner, hydrocarbon groups satisfying the requirement among straight-chain or branched-chain saturated hydrocarbon groups having up to 15 carbon atoms can be easily listed, and the saturated hydrocarbon group may be any thereof. A group represented by, for example, —(CH$_2$)m-O—(CH$_2$)n-CH$_3$ wherein n=0, 1, 2, 3 or 4, and m=1 or 2 is preferable. In a preferred embodiment, $R^1$ and $R^2$ are the same, and are the above-mentioned preferable group or more preferable group.

The N,N-disubstituted vinylbenzylamine (C) represented by general formula (I) is not particularly limited as to the substitution position of the vinyl group on the benzene ring, and may be, for example, a product of o-substitution or a p-substitution based on an amino group. Generally, the p-substitution product can be suitably used because it is easily available.

Preferable examples of the N,N-disubstituted vinylbenzylamine (C) represented by the general formula (I) may include, N,N-bis(ethyl)-4-vinylbenzylamine, N,N-bis(n-propyl)-4-vinylbenzylamine, N,N-bis(n-butyl)-4-vinylbenzylamine, N,N-bis(n-amyl)-4-vinylbenzylamine, N,N-bis(n-hexyl)-4-vinylbenzylamine, N,N-bis(n-octyl)-4-vinylbenzylamine, N,N-bis(n-decyl)-4-vinylbenzylamine, N,N-bis(n-dodecyl)-4-vinylbenzylamine, N,N-bis(2-methoxyethyl)-4-vinylbenzylamine, N,N-bis(2-ethoxyethyl)-4-vinylbenzylamine and N,N-di-2-ethylhexyl-4-vinylbenzylamine. Among them, from the viewpoint of resistance to impact, more preferable are N,N-bis(ethyl)-4-vinylbenzylamine, N,N-bis(n-propyl)-4-vinylbenzylamine, N,N-bis(n-butyl)-4-vinylbenzylamine, N,N-bis(n-amyl)-4-vinylbenzylamine, N,N-bis(n-hexyl)-4-vinylbenzylamine, N,N-bis(n-octyl)-4-vinylbenzylamine, N,N-bis(n-decyl)-4-vinylbenzylamine, N,N-bis(n-dodecyl)-4-vinylbenzylamine, and further preferable are N,N-bis(ethyl)-4-vinylbenzylamine and N,N-bis(n-propyl)-4-vinylbenzylamine. They may be used alone or in combination of two or more kinds.

In the production process of the present invention, the blending amount of the N,N-disubstituted vinylbenzylamine (C) is preferably 2.0 to 30% by weights, more preferably 5.0 to 20% by weight, further preferably 10 to 15% by weight based on the weight of ε-caprolactam.

The radical polymerization initiator (D) in the present invention is not particularly limited as long as it can initiate radical polymerization, and the following compounds can be used: organic peroxides such as peroxyketals such as 2,2-bis(4,4-di-t-butylperoxycyclohexyl)propane, 1,1-bis(t-butylperoxy)-3,3,5-trimethylcyclohexane, 1,1-bis(t-butylperoxy)cyclohexane and n-butyl-4,4-bis(t-butylperoxy)valerate, hydroperoxides such as cumene hydroperoxide and diisopropylbenzene peroxide, dialkyl peroxides such as t-butylcumyl peroxide and di-t-butyl peroxide, diacyl hydroperoxide such as lauroyl peroxide and benzoyl peroxide, peroxy dicarbonates such as bis(t-butylcyclohexyl)peroxy dicarbonate, and peroxy esters such as t-butyl-peroxybenzoate, t-butyl-peroxyacetate and 2,5-dimethyl-2,5-di(benzoylperoxy)hexane, azo compounds such as azoisobutyronitrile, 2,2-azobis(2-methylbutyronitrile) and 1,1-azobis (cyclohexane-1-carbonitrile), peroxides such as benzoyl peroxide, and phenyl-substituted ethanes such as hexaphenylethane, tetraphenyl succinodinitrile, tetraphenylethanediol (such as benzopinacol), tetraphenylethanediphenoxy and tetraphenylethanedi(trimethylsiloxane). Among them, preferable are azoisobutyronitrile and tetraphenylethanediol such as benzopinacol. They may be used alone or in combination of two or more kinds.

The blending amount of the radical polymerization initiator (D) is preferably 0.1 to 10% by weight, more preferably 1 to 5% by weight based on the weight of the N,N-disubstituted vinylbenzylamine (C).

The polymer composition of the present invention is obtained by polymerizing a polymerizable composition comprising the components (A) to (D) and ε-caprolactam as the component (E). Examples of the process for production of the polymer composition of the present invention include a process in which radical polymerization is conducted in the presence of an anionically polymerized polymer after anionic polymerization, a process in which anionic polymerization is conducted in the presence of a radically polymerized polymer after radical polymerization, and a process in which an anionically polymerized polymer and a radically polymerized polymer are homogeneously mixed in the presence of a solvent as necessary, but preferably the production process of the present invention is applied.

In the production process of the present invention, the above-mentioned radical polymerization initiator and radical polymerizable monomer and blending amounts thereof are applied for carrying out a reaction under such conditions that anionic polymerization is initiated and radical polymerization is conducted without hindering anionic polymerization. As for reaction conditions, the reaction temperature is 120 to 180° C., preferably 140 to 160° C., and the reaction time is 10 seconds to 120 minutes, preferably 30 to 60 minutes. In the production process of the present invention, ε-caprolactam, the anionic polymerization catalyst (A), the anionic polymerization activator (B), the N,N-disubstituted vinylbenzylamine (C) represented by general formula (I) and the radical polymerization initiator (D) are mixed, and placed under the above-mentioned reaction conditions preferably under normal pressure, thereby an anionic polymerization reaction and a radical polymerization reaction occur, so that the composition of the present invention is obtained. The above-mentioned components can be reacted by, for example, preparing in advance a system with the anionic polymerization catalyst (A) and the radical polymerization initiator (D) added to ε-caprolactam and a system with the anionic polymerization activator (B) and the N,N-disubstituted vinylbenzylamine (C) represented by general formula (I) added to ε-caprolactam, mixing both the systems and reacting the mixture under the reaction conditions described above.

For the chemical structure of a polyamide composition obtained by the production process of the present invention, the following findings have been obtained. That is, for example, a composition of Example has a peak on the high-molecular weight side as well as on the low-molecular weight side of the GPC chart of the composition. On the other hand, a polycaprolactam and a poly(N,N-disubstituted vinylbenzylamine) each have independent single peak around an elution time of 22 minutes and around an elution time of 27 minutes, respectively. For the composition of Example 1, a crystallinity and a melting point calculated from DSC measurements of the composition were almost equivalent to those of a blank. It is considered that the crystallinity and melting point of polyamide are reduced if an N,N-disubstituted vinylbenzylamine monomer compatible with caprolactam remains in a resultant composition of Example. But such a reduction is not observed from the results of Example, and it can be said that the possibility of remaining the N,N-disubstituted vinylbenzylamine monomer in the composition is low. No bleed-out occurred from the surface of the polyamide composition, and no sign of phase separation was observed from the appearance of the composition. Thus, the polyamide composition obtained by the production process of the present invention is not a mixture of a polycaprolactam and an N,N-disubstituted vinylbenzylamine monomer. Further, it is estimated from the results of measurements by an atomic force microscope (AFM) that crystalline regions made of polyamide and other amorphous regions are micro-dispersed in nano-scale. It is believed that the possibility is high that a poly(N,N-disubstituted vinylbenzylamine) is formed, and a polycaprolactam and the poly(N,N-disubstituted vinylbenzylamine) coexist, and form a polymer alloy. In this case, it is believed, in light of the raw material monomer, that the polycaprolactam and the poly(N,N-disubstituted vinylbenzylamine) do not form a bond at the end of the chain. Thus, anionic polymerization of a lactam monomer and radical polymerization of a vinyl monomer are conducted probably substantially in parallel using a mixture of these monomers as a starting raw material, and therefore according to the present invention, a novel process for production of a polymer alloy without relying on a polymer blend process is proposed.

EXAMPLES

The present invention will be described more specifically below by way of Examples, but the present invention is not limited to these Examples. Abbreviations in Tables are as described below.

4VBA: 4-vinylbenzylamine

Radical polymerizable monomer: N,N-disubstituted vinylbenzylamine monomer shown in Table 1

Examples 1 to 11

Preparation of Alloyed Polyamide Composition

In accordance with the formulation in Table 1, ε-caprolactam and each of the components were mixed to prepare a monomer mixed melt liquid, and the following procedure was carried out to obtain each of polyamide compositions in Examples 1 to 11. It is to be noted that 1.1% by weight of sodium lactamate as an anionic polymerization catalyst, 0.8% by weight of 1,6-hexamethylene diisocyanate as an anionic polymerization accelerator, 10% by weight of a N,N-disubstituted vinylbenzylamine monomer and 0.03% by weight of benzopinacol as a radical polymerization initiator based on the weight of ε-caprolactam were used. Reaction conditions include a reaction in an open system at 160° C. for 60 minutes. That is, 100 parts by weight of sufficiently dried ε-caprolactam were melted by heating to 100° C., 0.4 parts by weight of metal sodium were dissolved therein, and 0.6 parts by weight of a radical polymerization initiator were then blended to prepare a liquid A (equivalent to 2.2 parts by weight of Na-caprolactamate). Further, in another system, 1.6 parts by weight of 1,6-hexamethylene diisocyanate and 20 parts by weight of an N,N-disubstituted vinylbenzylamine monomer were blended with 100 parts by weight of sufficiently dried ε-caprolactam, and the mixture was melted by heating to 110° C. to prepare a liquid B. The liquid A and the liquid B were mixed just before being poured into a mold. The mixed melt liquid was poured into a mold kept at 160° C. by heating, and polymerization was conducted at this temperature in an open system. The reaction mixture was retained for 60 minutes while keeping the mold temperature at 160° C., followed by demolding to obtain a test piece.

Comparative Examples 1 to 3

Preparation of Blank Polyamide Composition 100 parts by weight of sufficiently dried ε-caprolactam were melted by heating to 100° C., and 0.4 parts by weight of metal sodium were dissolved therein to prepare a liquid A (equivalent to 2.2 parts by weight of Na-caprolactamate). Further, in another system, 1.6 parts by weight of 1,6-hexamethylene diisocyanate were blended with 100 parts by weight of sufficiently dried ε-caprolactam, and the mixture was melted by heating to 110° C. to prepare a liquid B. The liquid A and the liquid B were mixed just before being poured into a mold. The mixed melt liquid was poured into a mold kept at 160° C. by heating, and polymerization was conducted at this temperature in an open system. The reaction mixture was retained for 60 minutes while keeping the mold temperature at 160° C., followed by demolding to obtain a test piece.

TABLE 1

| | Radical polymerizable monomer | Number of carbons | Blending amount of radical polymerizable monomer | Blending amount of ε-caprolactam | Compatibility of monomer |
|---|---|---|---|---|---|
| Example 1 | Diethyl-4VBA | 2 | 10 | 100 | Compatible |
| Example 2 | Dipropyl-4VBA | 3 | 10 | 100 | Compatible |

TABLE 1-continued

|  | Radical polymerizable monomer | Number of carbons | Blending amount of radical polymerizable monomer | Blending amount of ε-caprolactam | Compatibility of monomer |
|---|---|---|---|---|---|
| Example 3 | Dibutyl-4VBA | 4 | 10 | 100 | Compatible |
| Example 4 | Diamyl-4VBA | 5 | 10 | 100 | Compatible |
| Example 5 | Dihexyl-4VBA | 6 | 10 | 100 | Compatible |
| Example 6 | Di-n-octyl-4VBA | 8 | 10 | 100 | Compatible |
| Example 7 | Didecyl-4VBA | 10 | 10 | 100 | Compatible |
| Example 8 | Didodecyl-4VBA | 12 | 10 | 100 | Compatible |
| Example 9 | 2-ethylhexyl-4VBA | 8 | 10 | 100 | Compatible |
| Example 10 | Bis-methoxyethyl-4VBA | 6 | 10 | 100 | Compatible |
| Example 11 | Bis-ethoxyethyl-4VBA | 8 | 10 | 100 | Compatible |

For the obtained monomer mixed melt liquid and polymer composition, the following evaluations were made. The results are shown in Tables 1 and 2. In the tables, "-" represents no measurements. Comparative Example 1 is a blank polyamide (water content: 120 ppm), Comparative Example 2 is blank polyamide (water content: 500 ppm), and Comparative example 3 is a blank polyamide (water content: 1000 ppm).

Evaluation 1: Compatibility of Monomer

Method: Compatibility of a caprolactam and a radical-polymerizable monomer raw material was determined by visual inspection. A monomer mixed melt liquid of a caprolactam and a radical-polymerizable monomer raw material was observed at 110° C., and they were determined to be compatible when the melt liquid was clear, and they were determined to be incompatible when the mixed melt liquid became cloud or turbid.

Evaluation 2: Appearance of the Obtained Polymer (Presence/Absence of Bleed-Out)

Method: Evaluations were made by visual inspection. For bleed-out of the polymer surface, a state of wetness and presence/absence of heterogeneous components precipitated were checked. It was determined that no bleed-out occurred when absence of bleed-out was confirmed by visual inspection.

Evaluation 3: Izod Notch Impact Strength (J/m) of Polymer

Method: Izod impact strength: measurement was performed at 23° C. in accordance with ASTM D256.

Evaluation 4: Crystallinity of Polymer (DSC Measurement)

Figure 2:
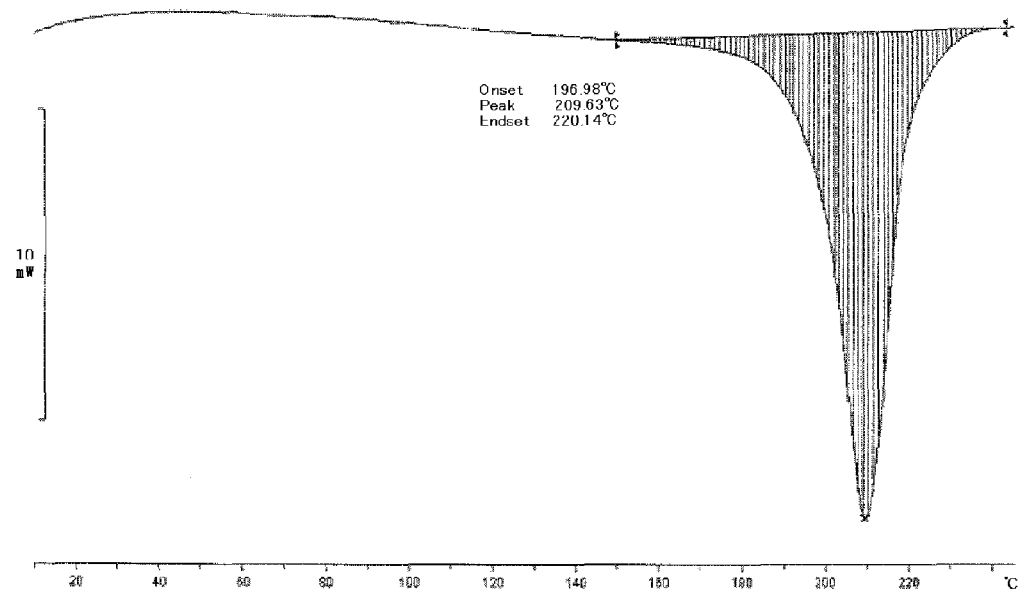
FIG. 2 is a DSC chart for a polymer composition of Example

Method: DSC measurement was performed for calculating a crystallinity of a polyamide. Measurement was performed while elevating a temperature from room temperature to 250° C. at a rate of 20° C./min. An amount of heat of melting (J/g) of the polyamide calculated from a DSC melt peak area was divided by 191 J/g, a theoretical value corresponding to 100% of crystallinity of the polyamide, a value thus obtained was expressed as a percentage and employed as a crystallinity of the polyamide. As an example, a DSC chart for the polymer composition of Example 1 is shown in FIG. 2.

Evaluation 5: Measurement of Molecular Weight (GPC Measurement) Conditions:

Eluent: Hexafluoroisopropanol (5 mol/L, containing sodium trifluoroacetate)

Standard substance: PMMA, dimethylphthalate

Column temperature: 40° C.

Column: Shodex GPCHFIP-806M×2, HFIP-803 (manufactured by Showa Denko K.K.)

As an example, a GPC chart for the polymer composition of Example 1 is shown in FIG. 1.

Evaluation 6: Measurement of the Amount of Unreacted Monomer

Method: The amount of an unreacted monomer extracted with hot water at 80° C. for 3 days was measured by the following method: about 1.0 g of test piece cut out from the polyamide polymer composition was immersed in hot water at 80° C. for 3 days. After immersion, the weight of the test piece dried under a reduced pressure of 0.1 MPa or less at 120° C. for 12 hours was measured, and employed as a weight of the test piece after hot water extraction. The amount of an unreacted monomer was expressed by the following formula:

the amount of unreacted monomer(wt %)=[weight of test piece before hot water extraction−weight of test piece after hot water extraction]/weight of test piece before hot water extraction×100(%).

TABLE 2

|  | Weight average molecular weight on the high-molecular weight side | Weight average molecular weight on the low-molecular weight side | Crystallinity (just after polymerization) (%) | Attainable crystallinity at fall of temperature (%) | Izod impact strength (J/m) | Amount of unreacted monomer (wt %) | Bleed-out |
|---|---|---|---|---|---|---|---|
| Example 1 | 401200 | 6000 | 51.7 | 29.1 | 85.6 | — | None |
| Example 2 | 398800 | 6700 | 53.3 | 27.0 | 94.0 | 1.7 | None |
| Example 3 | 113700 | 6200 | 48.2 | 29.1 | 82.7 | 1.7 | None |
| Example 4 | 409900 | 6500 | 53.7 | 29.4 | 92.4 | 1.6 | None |
| Example 5 | 257300 | 5800 | 58.0 | 26.7 | 82.1 | 2.5 | None |
| Example 6 | 419500 | 5000 | 53.8 | 29.7 | 85.6 | 2.0 | None |
| Example 7 | 332600 | 3500 | 57.3 | 26.4 | 81.3 | 1.4 | None |
| Example 8 | 285500 | 1700 | 55.6 | 27.4 | 80.6 | 1.5 | None |

TABLE 2-continued

|  | Weight average molecular weight on the high-molecular weight side | Weight average molecular weight on the low-molecular weight side | Crystallinity (just after polymerization) (%) | Attainable crystallinity at fall of temperature (%) | Izod impact strength (J/m) | Amount of unreacted monomer (wt %) | Bleed-out |
|---|---|---|---|---|---|---|---|
| Example 9 | 325800 | 8200 | 52.0 | 26.3 | 85.1 | 1.8 | None |
| Example 10 | 401800 | 8000 | 54.8 | 29.7 | 70.2 | 2.3 | None |
| Example 11 | 271200 | 7900 | 53.1 | 29.7 | 91.8 | 1.9 | None |
| Comparative Example 1 | 501000 | — | 55.4 | 30.9 | 60.0 | 1.1 | None |
| Comparative Example 2 | 203000 | — | — | — | — | — | — |
| Comparative Example 3 | 110000 | — | — | — | — | — | — |

It is considered from Table 2 that molecular weight measurement peaks of the polyamide compositions of Examples 1 to 11 exist on the high-molecular weight side and the low-molecular weight side, and the high-molecular weight side corresponds to a polyamide while low-molecular weight side corresponds to a polymer generated by radical polymerization. Polymers of Comparative Examples 1 to 3 contain no low-molecular weight component.

Comparison of weight average molecular weights on the high-molecular weight side shows that the weight average molecular weight of the polyamide composition was lower than the weight average molecular weight of a control polyamide of Comparative Example 1 (water content: 120 ppm), but higher than the weight average molecular weights of a control polyamide of Comparative Example 2 (water content: 500 ppm) and a control polyamide of Comparative Example 3 (water content: 1000 ppm). Thus, it is found that in the production process of the present invention, a hindering effect on anionic polymerization is low. On the other hand, the weight average molecular weight on the low-molecular weight side in Examples 1 to 11 is considered to be associated with a radically polymerized polymer. The molecular weight is increased by radical polymerization because the weight average molecular weight is about 5000 to 8000. Some of the polyamide compositions (i.e. Examples 7 and 8) have a low polymerization degree, and this is thought to be because the monomer molecular weight was large, so that the end group concentration became relatively low, and therefore the polymerization degree was hard to be increased.

Figure 3:
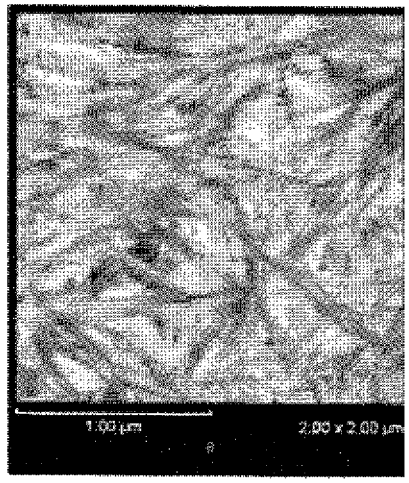
FIG. 3 is a photograph by AFM for the polymer composition of Example 1 and a polymer composition of Comparative Example 1.
Figure 3:
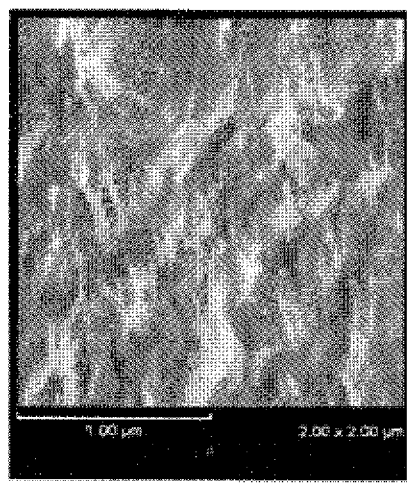

Evaluation 7: Observation by AFM
Method: For examining the morphology of a polymer, phase-contrast mode measurement by an AFM (atomic force microscope) was performed. The breakage surfaces (2 μm×2 μm) of the polymers in Example 1 and Comparative Example 1 were observed by a tapping mode AFM. For an AFM measuring apparatus, Shimadzu Scanning Probe Microscope SPM-9600 was used. The results are shown in FIG. 3. The left figure shows Comparative Example 1, and the right figure shows Example 1.

A difference in brightness in each of the images of FIG. 3 is caused by a difference in elastic modulus of the polymer surface, and the elastic modulus is higher in lighter regions and lower in darker regions. In the results with the image of a blank (polymer of Comparative Example 1), light regions are domains in a crystalline state, while dark regions are domains in an amorphous state, and these regions can be clearly distinguished. On the other hand, in an alloyed polyamide (polymer of Example 1), there is also a difference in brightness, but a morphology obviously different from the blank is shown, and a region having an extremely low elastic modulus, which indicates a poly(N,N-disubstituted vinylbenzylamine) is not found, and it can be determined that crystalline regions made of a polyamide and other amorphous regions are micro-dispersed in nano-scale.

The invention claimed is:

1. A polymerizable composition, comprising:
(A) an anionic polymerization catalyst;
(B) an anionic polymerization activator;
(C) 2.0 to 30% by weight, based on the weight of ε-caprolactam, of an N,N-disubstituted vinylbenzylamine represented by general formula (I):

[Chemical Formula 1]

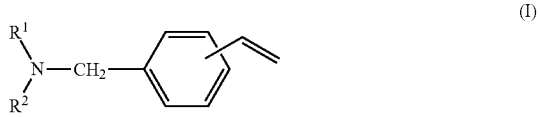

(I)

wherein $R^1$ and $R^2$ are the same or different and each are a straight-chain or branched-chain saturated hydrocarbon group having 2 to 15 carbon atoms, wherein the saturated hydrocarbon group may have one —O— bond between two carbon atoms when the number of carbon atoms is 2, and one or two —O— bonds between two carbon atoms when the number of carbon atoms is 3 or more;
(D) a radical polymerization initiator; and
(E) ε-caprolactam.

2. The polymerizable composition according to claim 1, wherein the N,N-disubstituted vinylbenzylamine (C) is one in which $R^1$ and $R^2$ in general formula (I) are the same or different and each are a straight-chain or branched-chain alkyl group having 2 to 12 carbon atoms.

3. The polymerizable composition according to claim 1, wherein the N,N-disubstituted vinylbenzylamine (C) is one in which $R^1$ and $R^2$ in general formula (I) are the same or different and each are a straight-chain or branched-chain saturated hydrocarbon group having 2 to 12 carbon atoms wherein the saturated hydrocarbon group has one —O— bond between two carbon atoms.

4. The polymerizable composition according to claim 3, wherein the N,N-disubstituted vinylbenzylamine (C) is one in which $R^1$ and $R^2$ in general formula (I) are the same and each are a group represented by —$(CH_2)m$—O—$(CH_2)n$—$CH_3$ wherein n=0, 1, 2, 3 or 4, and m=1 or 2.

5. The polymerizable composition according to claim 1, wherein the N,N-disubstituted vinylbenzylamine (C) is at least one selected from the group consisting of N,N-bis(ethyl)-4-vinylbenzylamine, N,N-bis(n-propyl)-4-vinylbenzylamine, N,N-bis(n-butyl)-4-vinylbenzylamine, N,N-bis(n-amyl)-4-vinylbenzylamine, N,N-bis(n-hexyl)-4-vinylbenzylamine, N,N-bis(n-octyl)-4-vinylbenzylamine, N,N-bis(n-decyl)-4-vinylbenzylamine, N,N-bis(n-dodecyl)-4-vinylbenzylamine, N,N-bis(2-methoxyethyl)-4-vinylbenzylamine, N,N-bis(2-ethoxyethyl)-4-vinylbenzylamine and N,N-di-2-ethylhexyl-4-vinylbenzylamine.

6. The polymerizable composition according to claim 5, wherein the radical polymerization initiator (D) is tetraphenylethanediol.

7. The polymerizable composition according to claim 1, wherein the polymerizable composition contains 0.01 to 20% by weight of the radical polymerization initiator (D) based on the weight of the N,N-disubstituted vinylbenzylamine (C).

8. A polymer composition obtained by polymerizing the polymerizable composition according to claim 1.

9. A process for producing a polyamide composition, comprising:
initiating anionic polymerization of ε-caprolactam in the presence of
(A) an anionic polymerization catalyst;
(B) an anionic polymerization activator;
(C) 2.0 to 30% by weight, based on the weight of ε-caprolactam, of an N,N-disubstituted vinylbenzylamine represented by general formula (I):

[Chemical Formula 2]

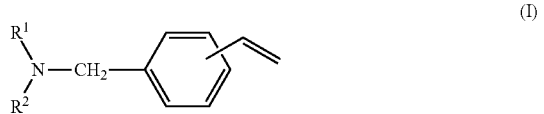

wherein $R^1$ and $R^2$ are the same or different and each are a straight-chain or branched-chain saturated hydrocarbon group having 2 to 15 carbon atoms, wherein the saturated hydrocarbon group may have one —O— bond between two carbon atoms is 2, and one or two —O— bonds between two carbon atoms when the number of carbon atoms is 3 or more; and
(D) a radical polymerization initiator,
and subjecting the resulting system to reaction under conditions of a reaction temperature of the reaction system of 120 to 180° C. and a reaction time of 10 seconds to 120 minutes.

10. The process according to claim 9, wherein the N,N-disubstituted vinylbenzylamine (C) is one in which $R^1$ and $R^2$ in general formula (I) are the same or different and each are a straight-chain or branched-chain alkyl group having 2 to 12 carbon atoms.

11. The process according to claim 9, wherein the N,N-disubstituted vinylbenzylamine (C) is one in which $R^1$ and $R^2$ in general formula (I) are the same or different and each are a straight-chain or branched-chain saturated hydrocarbon group having 2 to 12 carbon atoms wherein the saturated hydrocarbon group has one —O— bond between two carbon atoms.

12. The process according to claim 11, wherein the N,N-disubstituted vinylbenzylamine (C) is one in which $R^1$ and $R^2$ in general formula (I) are the same and each are a group represented by $-(CH_2)m-O-(CH_2)n-CH_3$ wherein n=0, 1, 2, 3 or 4, and m=1 or 2.

13. The process according to claim 9, wherein the N,N-disubstituted vinylbenzylamine (C) is at least one selected from the group consisting of N,N-bis(ethyl)-4-vinylbenzylamine, N,N-bis(n-propyl)-4-vinylbenzylamine, N,N-bis(n-butyl)-4-vinylbenzylamine, N,N-bis(n-amyl)-4-vinylbenzylamine, N,N-bis(n-hexyl)-4-vinylbenzylamine, N,N-bis(n-octyl)-4-vinylbenzylamine, N,N-bis(n-decyl)-4-vinylbenzylamine, N,N-bis(n-dodecyl)-4-vinylbenzylamine, N,N-bis(2-methoxyethyl)-4-vinylbenzylamine, N,N-bis(2-ethoxyethyl)-4-vinylbenzylamine and N,N-di-2-ethylhexyl-4-vinylbenzylamine.

14. The process according to claim 9, wherein the radical polymerization initiator (D) is tetraphenylethanediol.

15. The process according to claim 9, wherein the radical polymerization initiator (D) is present in an amount of 0.01 to 20% by weight based on the weight of the N,N-disubstituted vinylbenzylamine (C).

* * * * *